United States Patent [19]

Ueda et al.

[11] Patent Number: 5,233,956
[45] Date of Patent: Aug. 10, 1993

[54] INTERNAL COMBUSTION ENGINE

[75] Inventors: Takanori Ueda, Susono; Shizuo Sasaki, Namazu, both of Japan

[73] Assignee: Toyota Jidosha Kabushiki Kaisha, Toyota, Japan

[21] Appl. No.: 945,182

[22] Filed: Sep. 15, 1992

[30] Foreign Application Priority Data

Sep. 20, 1991 [JP] Japan .................... 3-241447

[51] Int. Cl.⁵ .................................... F02B 3/00
[52] U.S. Cl. .................... 123/302; 123/432; 123/305; 123/308
[58] Field of Search .............. 123/298, 302, 305, 432, 123/308

[56] References Cited

U.S. PATENT DOCUMENTS

| | | | |
|---|---|---|---|
| 2,800,118 | 7/1957 | Scherenberg | 123/298 |
| 2,952,250 | 9/1960 | Henry-Biabaud | 123/298 |
| 2,986,129 | 5/1961 | Henry-Biabaud | 123/298 |
| 4,760,821 | 8/1988 | Aupor et al. | 123/308 |
| 4,856,473 | 8/1989 | Kawai et al. | 123/308 |
| 4,955,339 | 9/1990 | Sasaki et al. | 123/295 |
| 4,957,081 | 9/1990 | Ito et al. | 123/302 |
| 5,127,378 | 7/1992 | Ito | 123/300 |
| 5,127,379 | 7/1992 | Kobayashi | 123/302 |
| 5,140,958 | 8/1992 | Kobayashi et al. | 123/302 |
| 5,170,759 | 12/1992 | Ito | 123/300 |

FOREIGN PATENT DOCUMENTS

| | | |
|---|---|---|
| 0488254 | 11/1991 | European Pat. Off. . |
| 62-153513 | 8/1987 | Japan . |
| 1-173416 | 12/1989 | Japan . |
| 91/12419 | 8/1991 | PCT Int'l Appl. . |

Primary Examiner—E. Rollins Cross
Assistant Examiner—Erick Solis
Attorney, Agent, or Firm—Kenyon & Kenyon

[57] ABSTRACT

An engine comprising a fuel injector arranged on the inner wall of the cylinder in the vicinity of the intake valve. When the engine is operating under a heavy load, fuel is injected by the fuel injector during the intake stroke toward the rear face of the valve head of the intake valve. At this time, the injected fuel impinges upon the rear face of the valve head of the intake valve and is reflected thereon. Then, the injected fuel flows into the intake port.

13 Claims, 10 Drawing Sheets

INTERNAL COMBUSTION ENGINE

BACKGROUND OF THE INVENTION

1. Field of the Invention

The present invention relates to an internal combustion engine.

2. Description of the Related Art

In a known direct injection type engine, a fuel injector is arranged on the inner wall of the cylinder head in the vicinity of the intake valve. Fuel is injected by the fuel injector during the compression stroke when the engine is operating under a light load, and fuel is injected by the fuel injector during the intake stroke when the engine is operating under a heavy load (see Japanese Unexamined Utility Model Publication No. 1-173416). In this direct injection type engine, when the engine is operating under a heavy load, fuel is injected toward the rear face of the valve head of the intake valve, which is open. The fuel that has impinged upon the rear face of the valve head of the intake valve spreads along the rear face of the valve head of the intake valve toward the surrounding region of the intake valve and is distributed in the combustion chamber, thereby increasing the usage rate of the air therein.

However, if the injected fuel is forced to flow along the rear face of the valve head of the intake valve after impinging upon the rear face of the valve head of the intake valve, a large part of the injected fuel spreads from the rear face of the valve head of the intake valve in the fuel injection direction. As a result, the injected fuel is concentrated in a particular restricted region of the combustion chamber, thereby making uniform distribution of the injected fuel in the combustion chamber impossible.

SUMMARY OF THE INVENTION

An object of the present invention is to provide an engine capable of uniformly distributing the injected fuel in the combustion chamber.

According to the present invention, there is provided an engine having a cylinder head, comprising: an intake valve arranged on an inner wall of the cylinder head; a fuel injector arranged on the inner wall of the cylinder head, the injection direction of the fuel injector being determined so that the fuel injected by the fuel injector impinges upon a rear face of a valve head of the intake valve when the amount of valve lift of the intake valve exceeds a predetermined amount, and the fuel injected by the fuel injector moves forward toward a combustion chamber beneath the intake valve when the amount of valve lift of the intake valve is smaller than the predetermined amount; the injection pressure of the fuel injector being determined so that, when the fuel injected by the fuel injector impinges upon the rear face of the valve head of the intake valve, the fuel is reflected on the rear face of the valve head of the intake valve and flows into an intake port of the intake valve; and injection control means for controlling the injection time and the amount of fuel injected by the fuel injector so as to inject fuel during at least one of the intake strokes and compression strokes, with at least part of fuel injected by the fuel injector impinging upon the rear face of the valve head of the intake valve whenever the fuel injecting operation is carried out during the intake stroke, and the fuel injected by the fuel injector moving forward toward the combustion chamber beneath the intake valve when the fuel injecting operation is carried out during the compression stroke.

The present invention may be more fully understood from the description of a preferred embodiment of the invention set forth below, together with accompanying drawings.

DESCRIPTION OF A PREFERRED EMBODIMENT

Figure 1:
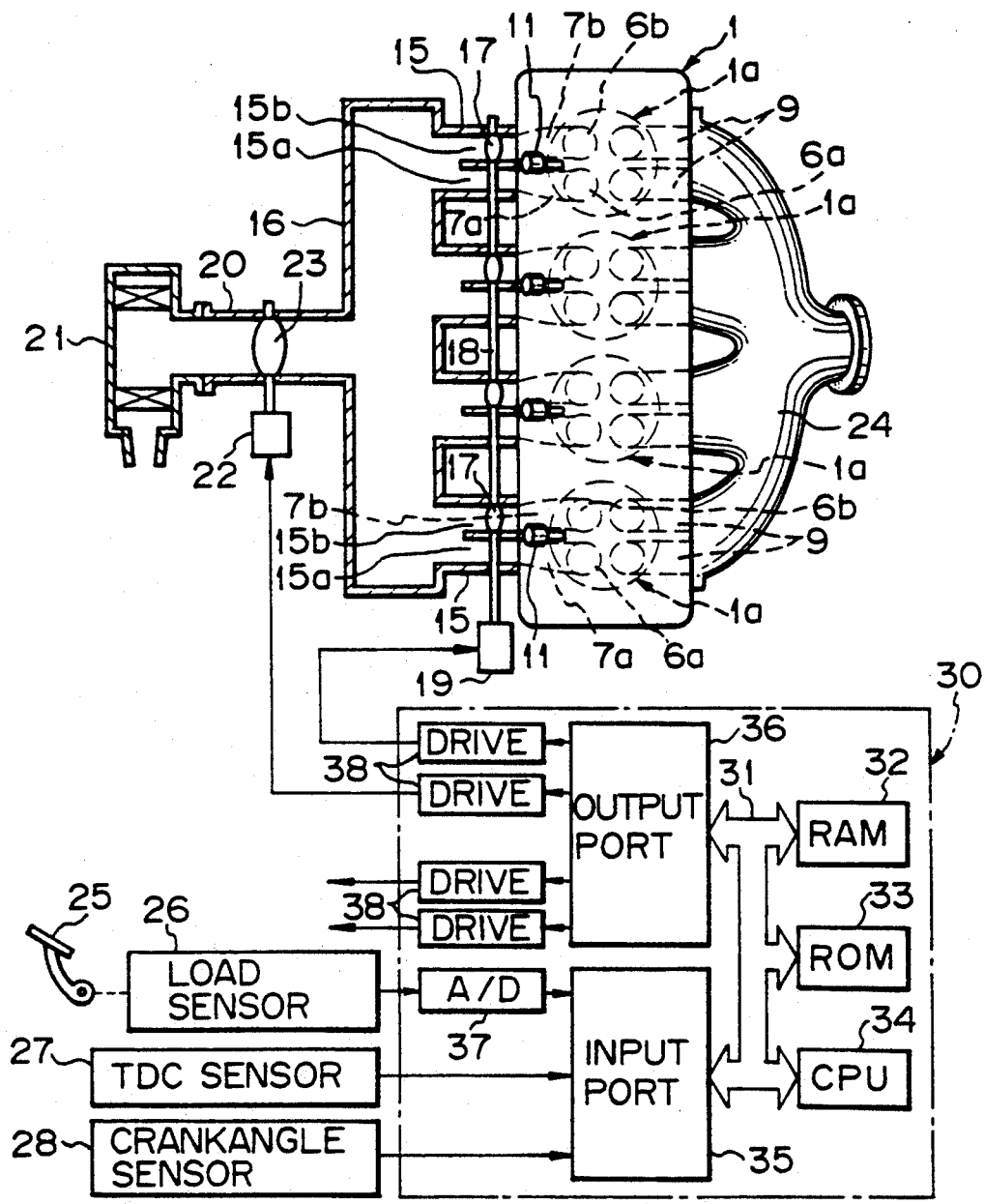
FIG. 1 is a general view of an engine.

Referring to FIG. 1, an engine body 1 comprises four cylinders 1a, and the construction of the cylinders 1a is illustrated in FIGS. 2 through 5.

Referring to FIGS. 2 through 5, reference numeral 2 designates a cylinder block, 3 a piston reciprocally movable in the cylinder block 2, 4 a cylinder head fixed to the cylinder block, and 5 a combustion chamber formed between the piston 3 and the cylinder head 4; 6a designates a first intake valve, 6b a second intake valve, 7a a first intake port, and 7b a second intake port; 8 designates a pair of exhaust valves, and 9 a pair of exhaust ports.

Figure 2:
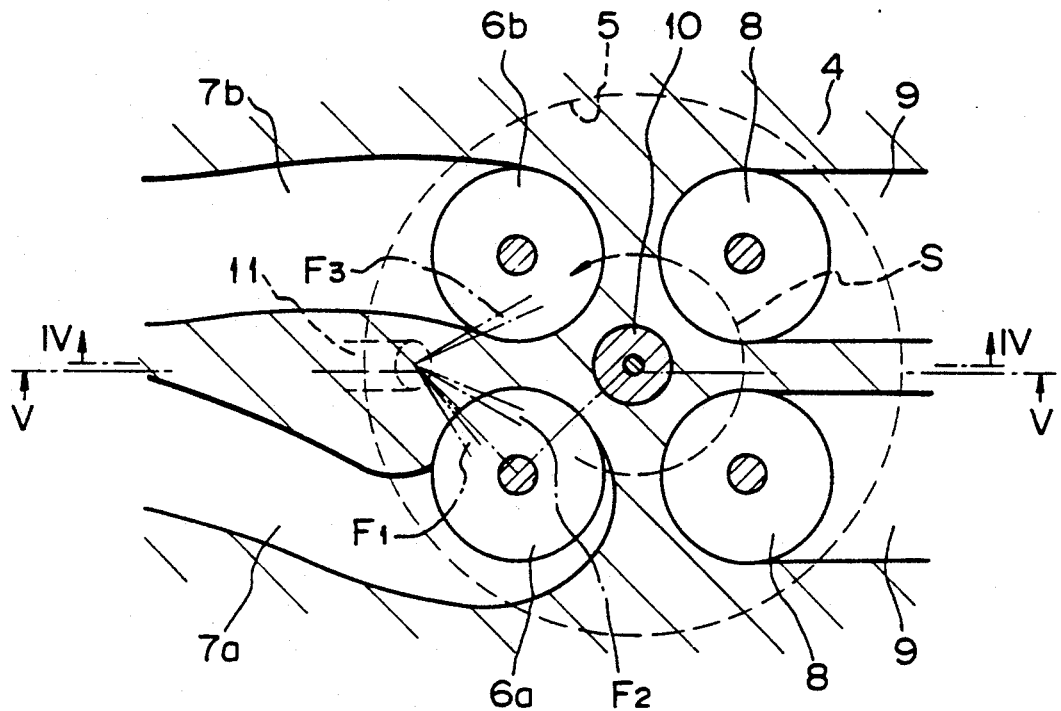
FIG. 2 is a cross-sectional plan view of a cylinder head.

As illustrated in FIG. 2, the first intake port 7a is constructed as a helical port, and the second intake port 7b is constructed as a substantially straight extending straight port. Furthermore, as illustrated in FIG. 2, a spark plug 10 is arranged at the central portion of the inner wall of the cylinder head 4, and a fuel injector 11 is arranged on the peripheral portion of the inner wall of the cylinder head 4 near the first intake valve 6a and the second intake valve 6b.

Figure 3:
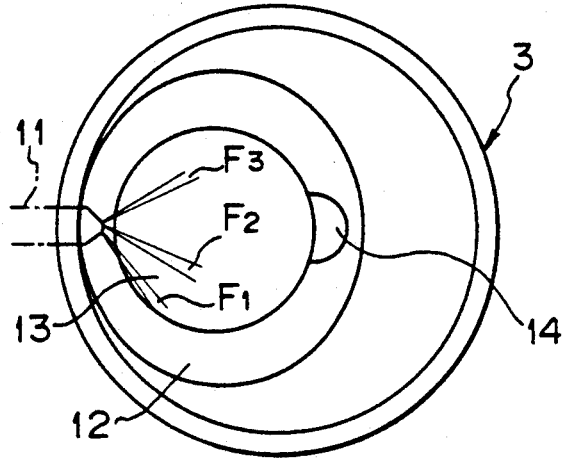
FIG. 3 is a plan view of the top face of a piston.
Figure 4:
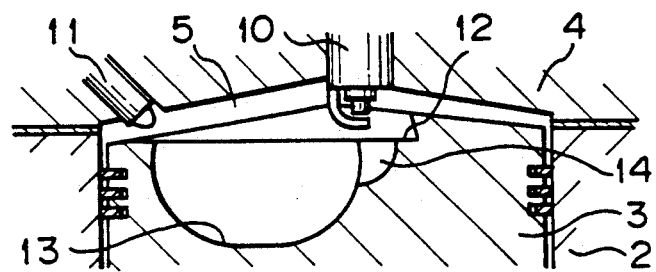
FIG. 4 is a cross-sectional view of the engine taken along the line IV—IV in FIG. 2.
Figure 5:
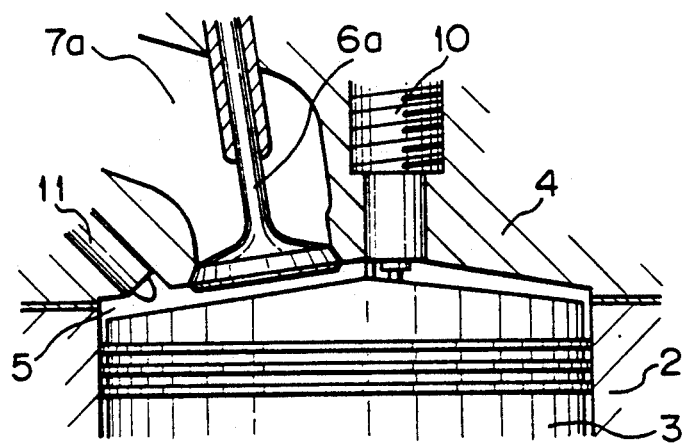
FIG. 5 is a cross-sectional view of the engine taken along the line V—V in FIG. 2.

As illustrated in FIGS. 3 and 4, a shallow dish portion 12 having a substantially circular shaped contour and extending from a point beneath the fuel injector 11 to a point beneath the spark plug 10 is formed on the top face of the piston 3, and a deep dish portion 13 having a substantially semi-spherical shape is formed on the central portion of the shallow dish portion 12. In addition, a recessed portion 14 having a substantially spherical shape is formed on the connecting portion of the shallow dish portion 12 and the deep dish portion 13 beneath the spark plug 10.

As illustrated in FIG. 1, the first intake port 7a and the second intake port 7b of each cylinder 1a are connected to a surge tank 16 via a first intake passage 15a and a second intake passage 15b formed in a branch pipe 15, respectively and, an intake control valve 17 is arranged in each second intake passage 15b. The intake control valves 17 are connected, via a common shaft 18, to an actuator 19 formed by, for example, a step motor. This step motor 19 is actuated on the basis of a signal output from an electronic control unit 30. The surge tank 16 is connected to an air cleaner 21 via an intake duct 20, and a throttle valve 23 driven by a step motor 22 is arranged in the intake duct 20. The throttle valve 23 is closed to some extent only when the engine load is extremely low, and the throttle valve 23 is maintained at a fully open position when the engine load becomes slightly high. The exhaust ports 9 of all the cylinders 1a are connected to an exhaust manifold 24.

The electronic control unit 30 is constructed as a digital computer and comprises a RAM (random access memory) 32, a ROM (read only memory) 33, a CPU (microprocessor etc.) 34, an input port 35 and an output port 36. The RAM 32, the ROM 33, the CPU 34, the input port 35 and the output port 36 are interconnected to each via a bidirectional bus 31. A load sensor 26 producing an output voltage that is proportional to the depression of the accelerator pedal 25 is connected to the accelerator pedal 25, and the output voltage of the load sensor 26 is input into the input port 35 via an AD converter 37. A TDC sensor 27 produces an output pulse when the crankangle of, for example, No. 1 cylinder 1a reaches top dead center in the intake stroke, and this output pulse is put into the input port 35. A crankangle sensor 28 produces an output pulse, for example, every revolution of 30 degrees of the crankshaft, and this output pulse is put into the input port 35. In the CPU 34, the current crankangle is calculated from the output pulse of the TDC sensor 27 and the output pulse of the crankangle sensor 28, and the engine speed is calculated from the output pulses of the crankangle sensor 28. The output port 36 is connected to the first fuel injector 11 and the step motors 19 and 22 via corresponding drive circuits 38.

Figure 6:
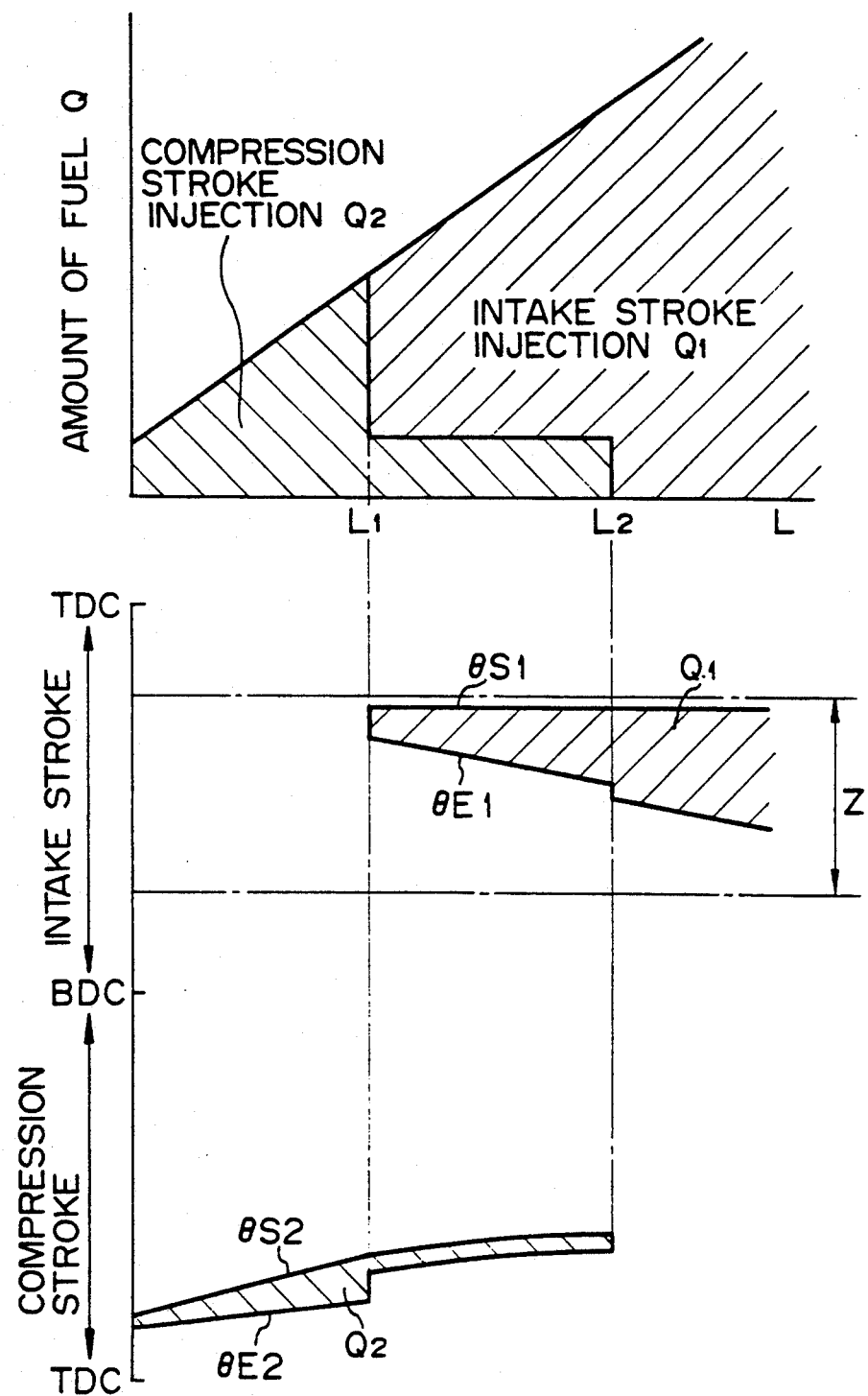
FIG. 6 is a view illustrating the amount of injection fuel and the injection time.

In the embodiment according to the present invention, fuel is injected by the fuel injector 11 in three directions as illustrated by $F_1$, $F_2$ and $F_3$ in FIGS. 2 and 3. FIG. 6 illustrates the amount of fuel injected and the injection time of the fuel injector 11. In FIG. 6, L indicates the depression of the accelerator pedal 25.

As can be seen from FIG. 6, when the engine is operating under a light load wherein the depression L of the accelerator pedal 25 is smaller than $L_1$, the amount of fuel $Q_1$ is injected by the fuel injector 11 at the end of the compression stroke. In addition, when the engine is operating under a middle load wherein the depression L of the accelerator pedal 25 is between $L_1$ and $L_2$, the amount of fuel $Q_1$ is injected by first fuel injector 11 during the intake stroke, and then the amount of fuel $Q_2$ is injected by the fuel injector 11 at the end of the compression stroke. Namely, when the engine is operating under a middle load, the fuel is injected twice by the fuel injector 11 during the intake stroke and at the end of the compression stroke. Furthermore, when the engine is operating under a heavy load wherein the depression L of the accelerator pedal 25 is larger than $L_2$, the amount of fuel $Q_1$ is injected by the fuel injector 11 during the compression stroke.

Note that, in FIG. 6, $\theta S1$ and $\theta E1$ indicate the injection start time and the injection completion time, respectively, of the fuel injection $Q_1$ that is carried out during the intake stroke, and $\theta S2$ and $\theta E2$ indicate the injection start time and the injection completion time, respectively, of the fuel injection $Q_2$ that is carried out at the end of the compression stroke.

In the embodiment according to the present invention, as illustrated in FIG. 2, the fuels $F_1$ and $F_2$ are injected by the fuel injector 11 so that they move forward beneath the first intake valve $6a$, and the fuel $F_3$ is injected by the fuel injector 11 so that it moves forward beneath the second intake valve $6b$. The fuels $F_1$ and $F_2$ impinge upon the rear face of the valve head of the first intake valve $6a$, and the fuel $F_3$ impinges upon the rear face of the valve head of the second intake valve $6b$ at the time of the intake stroke injection carried out when the engine is operating under a heavy load and at the time of the first fuel injection, i.e., the intake stroke injection carried out when the engine is operating under a middle load. This will be described next in reference to FIGS. 7 and 8.

Figure 7:
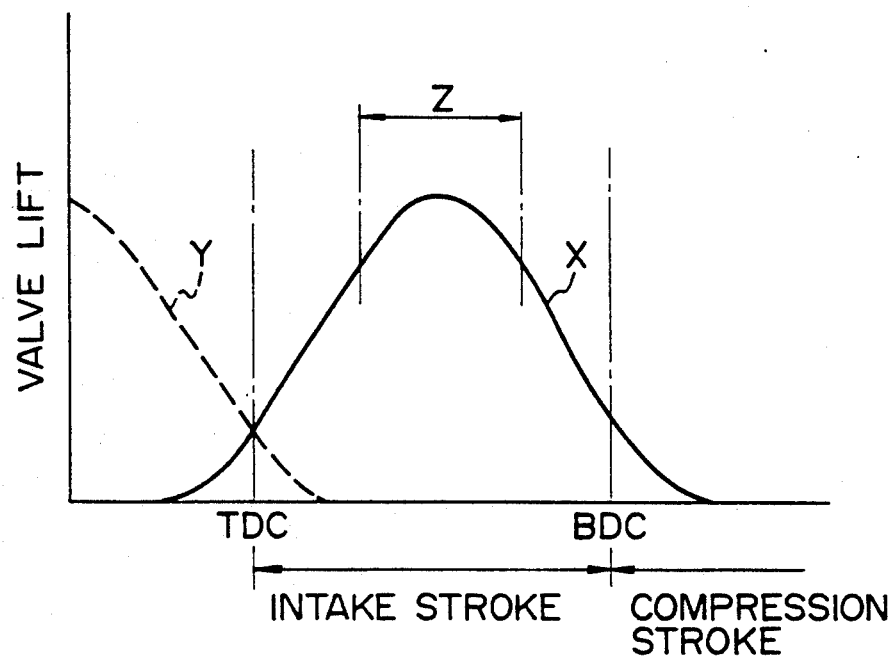
FIG. 7 is a view illustrating the amount of lift of the intake valve and the exhaust valve.

FIG. 7 illustrates the valve lift X of both the first intake valve $6a$ and the second intake valve $6b$ and the valve lift Y of the exhaust valves 8. As can be seen from FIG. 7, the valve lift X of the first intake valve $6a$ and the second intake valve $6b$ is maximum at the central portion of the intake stroke.

Figure 8A:
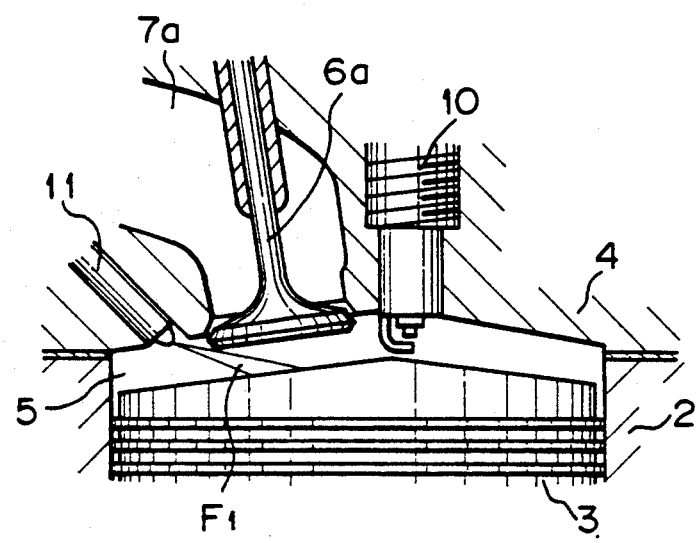
FIGS. 8A and 8B are cross-sectional side views of the engine, taken along the same cross-section as in FIG. 5.
Figure 8B:
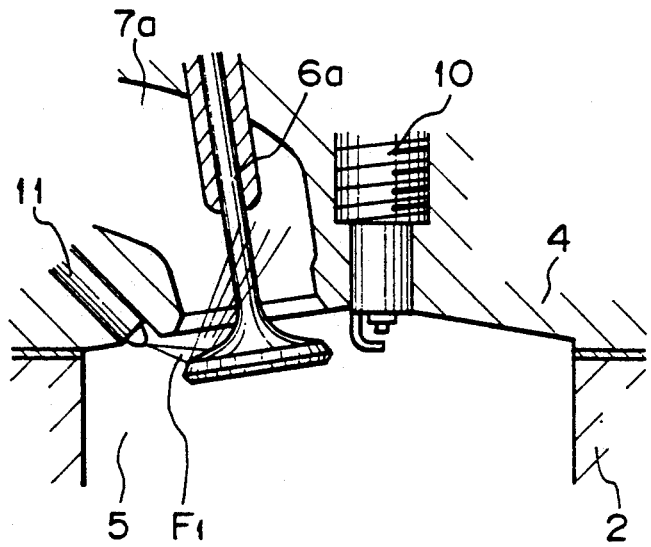

FIGS. 8A and 8B illustrate the relationship between the first intake valve $6a$ and the injected fuel $F_1$. As illustrated in FIGS. 8A and 8B, the fuel $F_1$ is injected slightly downward relative to the horizontal plane. In addition, the fuels $F_2$ and $F_3$ (not shown in FIGS. 8A and 8B) are also injected slightly downward relative to the horizontal plane. As can be seen from FIGS. 8A and 8B, the relative position between the first intake valve $6a$ and the fuel injector 11 and the injecting direction of fuel injected by the fuel injector 11 are determined so that the injected fuel $F_1$ does not impinge upon the first intake valve $6a$ when the amount of valve lift of the first intake valve $6a$ is small as illustrated in FIG. 8A, and the injected fuel $F_1$ impinges upon the rear face of the valve head of the first intake valve $6a$ when the amount of valve lift of the first intake valve $6a$ becomes large as illustrated in FIG. 8B. Z in FIG. 7 indicates a crankangle region in which the injected fuel $F_1$ impinges upon the rear face of the valve head of the first intake valve $6a$. In addition, the injected fuel $F_2$ (not shown in FIGS. 8A and 8B) also impinges upon the rear face of the valve head of the first intake valve $6a$ in this crankangle region Z, and the injected fuel $F_3$ (not shown in FIGS. 8A and 8B) impinges upon the rear face of the valve head of the second intake valve $6b$ in this crankangle region Z.

As mentioned above, if fuel is injected by the fuel injector 11 in the crankangle region Z illustrated in FIG. 7, the fuel $F_1$ thus injected impinges upon the rear face of the valve head of the first intake valve $6a$ as illustrated in FIG. 8B. At this time, if the velocity of the injected fuel $F_1$ is low, the injected fuel $F_1$ moves forward along the rear face of the valve head of the first intake valve $6a$ and then moves toward the peripheral portion of the combustion chamber 5, which is located opposite the fuel injector 11, after the injected fuel $F_1$ impinges upon the rear face of the valve head of the first intake valve 6a. However, if the velocity of the injected fuel $F_1$ is high, the injected fuel $F_1$ is reflected and moves forward to the first intake port 7a after it impinges upon the rear face of the valve head of the first intake valve 6a, as illustrated in FIG. 8B. Similarly, if the velocity of the injected fuel $F_2$ is high, the injected fuel $F_2$ is reflected and moves forward to the first intake port 7a after it impinges upon the rear face of the valve head of the first intake valve 6a, and if the velocity of the injected fuel $F_3$ is high, the injected fuel $F_3$ is reflected and moves forward to the second intake port 7b after it impinges upon the rear face of the valve head of the second intake valve 6b.

In the embodiment according to the present invention, the velocities of injected fuels $F_1$, $F_2$ and $F_3$ are determined so that the injected fuels $F_1$, $F_2$ and $F_3$ move forward to the first intake port 7a and the second intake port 7b after they are reflected on the rear faces of the valve heads of the first intake valve 7a and the second intake valve 7b. In this case, the velocities of injected fuels $F_1$, $F_2$ and $F_3$ are mainly determined by fuel injection pressure and, in the embodiment according to the present invention, the fuel injection pressure of the fuel injector 11 is set at more than 70 Kg/cm$^2$.

Figure 9:
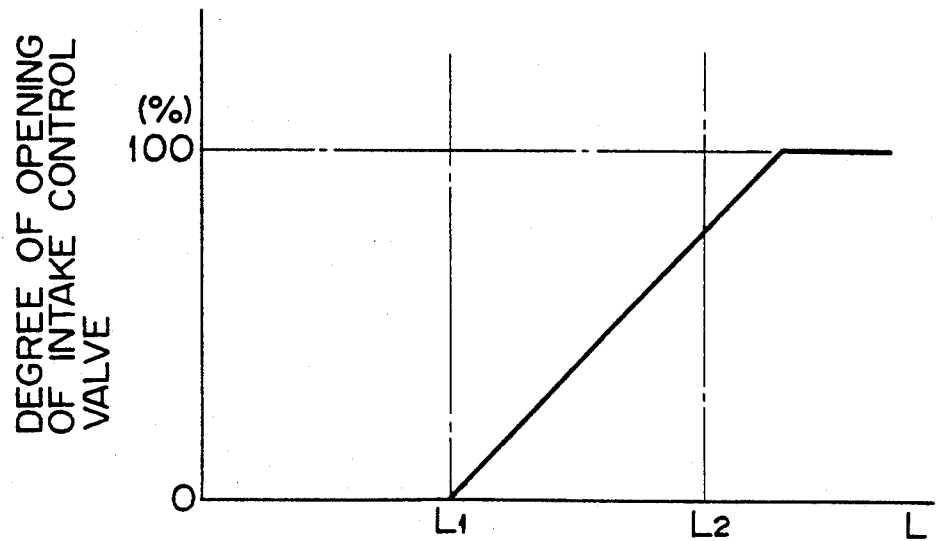
FIG. 9 is a diagram illustrating the degree of opening of the intake control valve.

FIG. 9 illustrates the relationship between the degree of opening of the intake control valve 17 and the depression L of the accelerator pedal 25. As illustrated in FIG. 9, when the engine is operating under a light load wherein the depression L of the accelerator 25 is smaller than $L_1$, the intake control valve 17 is maintained at the closed position and, when the depression L of the accelerator pedal 25 becomes larger than $L_1$, the degree of opening of the intake control valve 17 becomes large as the depression L of the accelerator pedal 25 becomes large. When the intake control valve 17 is closed, air flows, while swirling, into the combustion chamber 5 via the helically shaped first intake port 7a, and thus a strong swirl motion, as illustrated by the arrow S in FIG. 2, is created in the combustion chamber 5. Conversely, when the intake control valve 17 is open, air flows into the combustion chamber 5 also from the second intake port 7b.

In FIG. 6, the crankangle region Z, illustrated in FIG. 7, is shown. As can be seen from FIG. 6, in the embodiment according to the present invention, both the first fuel injection $Q_1$ under an engine middle load operating state and the fuel injection $Q_1$ under an engine high load operating state are carried out in the crankangle region Z. Accordingly, in the embodiment according to the present invention, the entire fuel injected by the fuel injector 11 during the intake stroke flows into the first intake port 7a and the second intake port 7b after it impinges upon the rear faces of the valve heads of the first intake valve 6a and the second intake valve 6b.

Figure 10A:
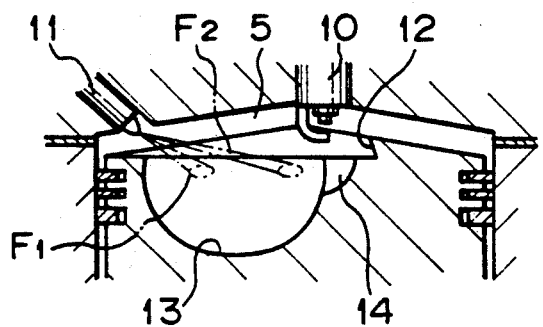
FIGS. 10A to 10C are views illustrating the combustion method under engine light load operation conditions.
Figure 10B:
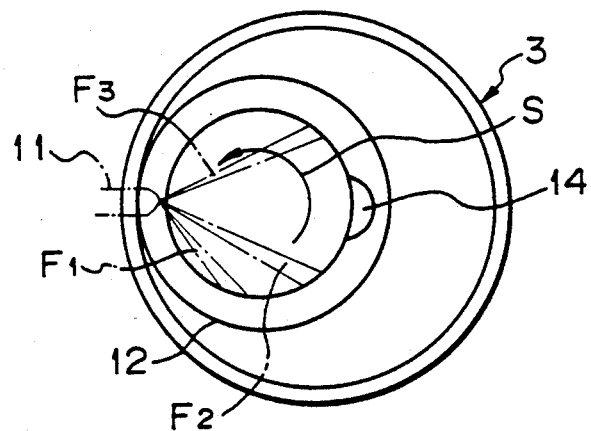
Figure 10C:
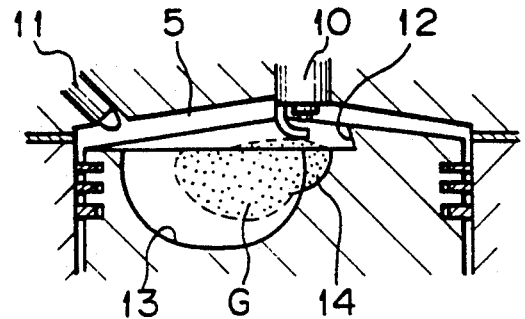
Figure 11A:
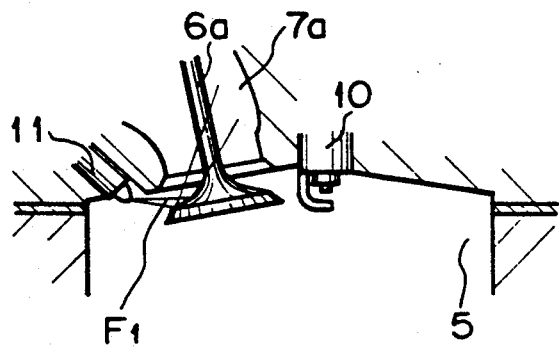
FIGS. 11A to 11C are views illustrating the combustion method under engine middle load operation conditions.
Figure 11B:
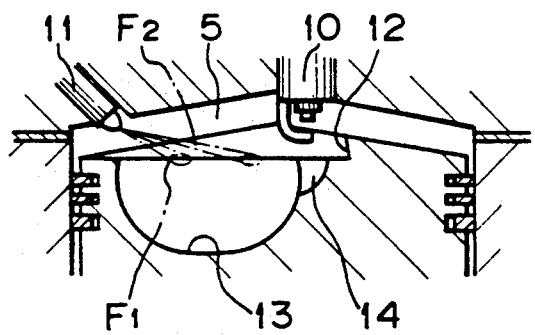
Figure 11C:
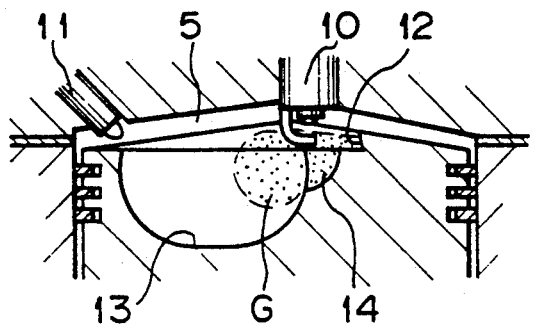
Figure 12:
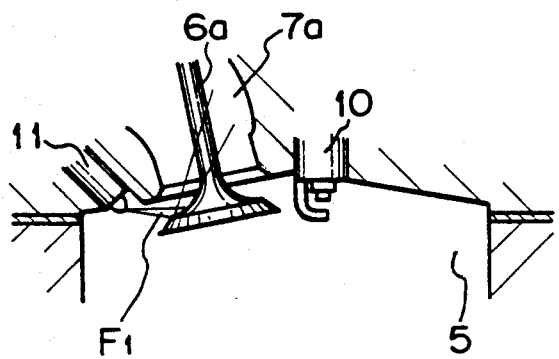
FIG. 12 is a view illustrating the combustion method under engine heavy load operation conditions.
Figure 13:
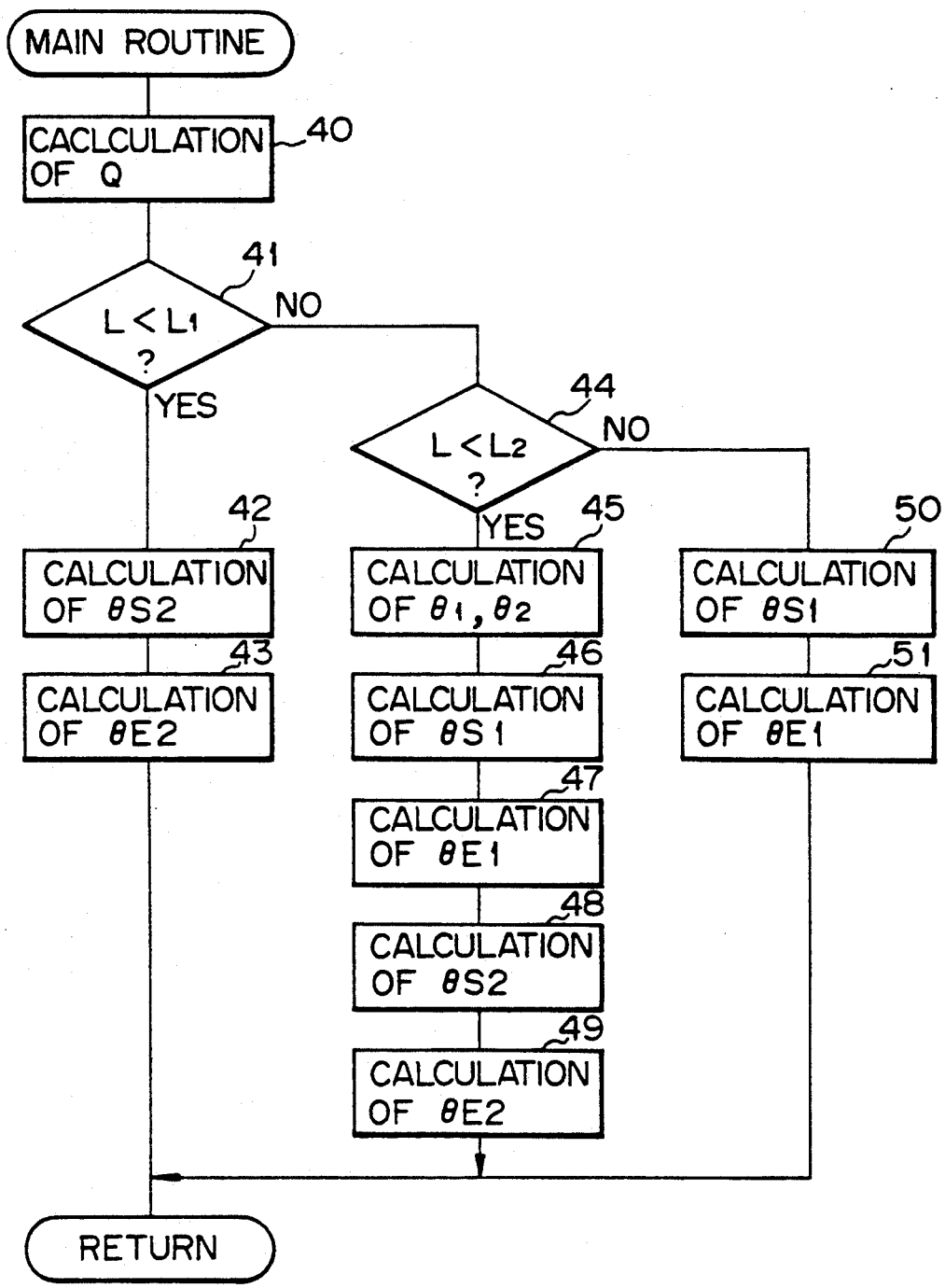
FIG. 13 is a flow chart for executing a main routine.

Next, the combustion method will be described with reference to FIGS. 6, and 10A to 12. Note that FIGS. 10A to 10C illustrate the combustion method under a light load operating state of the engine; FIGS. 11A to 11C illustrate the combustion method under a middle load operating state of the engine; and FIG. 13 illustrates the combustion method under a heavy load operating state of the engine.

As illustrated in FIG. 6, when the engine is operating under a light load wherein the depression L of the accelerator pedal 25 is lower than $L_1$, fuel is injected by the fuel injector 11 at the end of the compression stroke. At this time, as illustrated in FIGS. 10A and 10B, the injected fuels $F_1$, $F_2$ and $F_3$ impinge upon the circumferential wall of the deep dish portion 13. In this case, the amount of injected fuel $Q_2$ is increased as the depression L of the accelerator pedal 25 becomes large, as illustrated in FIG. 6. The fuel that impinges upon the circumferential wall of the deep dish portion 13 spreads, while being vaporized by the swirl motion S, and thereby an air-fuel mixture G is formed in the recessed portion 14 and the deep dish portion 13, as illustrated in FIG. 10C. At the time, the interior of the combustion chamber 5 other than the recessed portion 14 and the deep dish portion 13 is filled with air. Then, the air-fuel mixture G is ignited by the spark plug 10.

When the engine is operating under a middle load wherein the depression L of the accelerator pedal 25 is between $L_1$ and $L_2$ in FIG. 6, the first fuel injection $Q_1$ by the fuel injector 11 is carried out in the crankangle region Z, and then the second fuel injection $Q_2$ by the fuel injector 11 is carried out at the end of the compression stroke. Namely, initially, fuels are injected by the fuel injector 11 toward the rear faces of the valve heads of the first intake valve 6a and the second intake valve 6b as illustrated in FIG. 11A, and the injected fuels are reflected on the rear faces of the valve heads of the first intake valve 6a and the second intake valve 6b and flow into the first intake port 7a and the second intake port 7b. Then, the injected fuel flows again into the combustion chamber 5 together with air, and a lean air-fuel mixture is formed in the combustion chamber 5 by this injected fuel.

Then, the second fuel injection by the fuel injector 11 is carried out at the end of the compression stroke. As can be seen from FIG. 6, when the engine is operating under a middle load, the injection time of the compression stroke injection $Q_2$ is slightly advanced, compared with the case wherein the engine is operating under a light load. Accordingly, at this time, the fuel is injected toward both the deep dish portion 13 and the shallow dish portion 12 as illustrated in FIG. 11B, and an ignitable air-fuel mixture forming an ignition source is formed in the recessed portion 14 and the deep dish portion 13 by this injected fuel, as illustrated in FIG. 11C.

The air-fuel mixture G is ignited by the spark plug 10, and the lean air-fuel mixture formed in the entire interior of the combustion chamber 5 is ignited by the flame of the ignited air-fuel mixture G. In this case, since the fuel injected at the end of the compression stroke is used mainly for ignition only, the amount of fuel $Q_2$ injected at the end of the compression stroke remains constant regardless of the depression L of the accelerator pedal 25 when the engine is operating under a middle load, as illustrated in FIG. 6. Conversely, the amount of fuel $Q_1$ injected at the beginning of the intake stroke is increased as the depression L of the accelerator pedal 25 increases.

When the engine is operating under a heavy load wherein the depression L of the accelerator pedal 25 is larger than $L_2$ in FIG. 6, fuel is injected by the fuel injector 11 in the crankangle region Z during the intake stroke. Accordingly, at this time, fuels are injected by the fuel injector 11 toward the rear faces of the valve heads of the first intake valve 6a and the second intake value 6b as illustrated in FIG. 12, and the injected fuels are reflected on the rear faces of the valve heads of the first intake valve 6a and the second intake valve 6b and flows into the first intake port 7a and the second intake port 7b. Then, the injected fuel flows again into the combustion chamber 5 together with air, and a uniform air-fuel mixture is formed in the combustion chamber 5.

At this time, the amount of fuel $Q_1$ injected by the fuel injector 11 increases as the depression L of the accelerator pedal 25 increases, as illustrated in FIG. 6.

When the injected fuel reflected on the rear faces of the valve heads of the first intake valve 6a and the second intake valve 6b flows into the first intake port 7a and the second intake port 7b as illustrated in FIGS. 11A and 12, the injected fuel is mixed with air in the first intake port 7a and the second intake port 7b and then the injected fuel and air, which are sufficiently mixed, are fed into the combustion chamber 5. This is the same as the case wherein air-fuel mixtures are fed into the combustion chamber 5 via the first intake valve 6a and the second intake valve 6b, and accordingly, the injected fuel is uniformly distributed in the combustion chamber 5.

In addition, in the embodiment according to the present invention, as mentioned above, the velocity of fuel injected by the fuel injector 11 is increased so that the fuel injected by the fuel injector 11 flows into the first intake port 7a and the second intake port 7b after it is reflected on the first intake valve 6a and the second intake valve 6b. In this case, since the injected fuel impinges upon the rear faces of valve heads of the first intake valve 6a and the second intake valve 6b at a high speed, the injected fuel is atomized upon impingement, and thus the atomized fuel moves forward to the first intake port 7a and the second intake port 7b. At this time, since the moving direction of the fuel is opposite the flow direction of the inflow air, the fuel is subjected to a strong shearing force by the inflow air, and thus the fuel is further atomized. As mentioned above, since the injected fuel is atomized upon impingement and then atomized because of the strong shearing force, good atomization of the injected fuel can be obtained. As mentioned above, since the injected fuel is sufficiently atomized and, in addition, uniformly distributed in the combustion chamber 5, adequate combustion of the injected fuel can be obtained.

In the embodiment according to the present invention, the injection start time $\theta S1$ of the intake stroke injection $Q_1$ and the injection start time $\theta S2$ of the compression stroke injection $Q_2$, which are illustrated in FIG. 6, are determined in advance and stored in the ROM 33 as a function of the depression L of the accelerator pedal 25. Accordingly, the injection completion times $\theta E1$ and $\theta E2$ are controlled on the basis of the amount of fuel $Q_1$ and $Q_2$ to be injected, respectively.

FIG. 13 illustrates a routine for controlling the fuel injection, and this routine is repeatedly executed.

Figure 14:
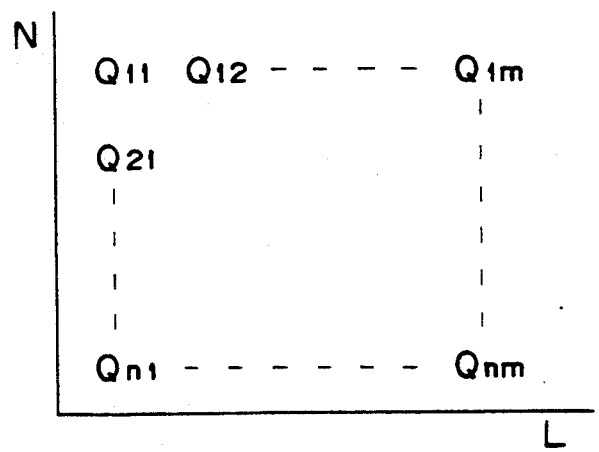
FIG. 14 is a view illustrating the map of injection time.

Referring to FIG. 13, in step 40, the amount of fuel Q is calculated. This amount of fuel Q is stored in advance in the ROM 33 as a function of the engine speed N and the depression L of the accelerator pedal 25, as illustrated in FIG. 14. Then, in step 41, it is determined whether or not the depression L of the accelerator pedal 25 is smaller than $L_2$, i.e., the engine is operating under a light load. If $L < L_1$, the procedure goes to step 42, and the injection start time $\theta S2$ of the compression stroke injection is calculated. Then, in step 43, in injection completion time $\theta E2$ is calculated from the injection start time $\theta S2$, the amount of fuel Q and the engine speed N.

When it is determined in step 41 that $L \geq L_1$, the procedure goes to step 44, and it is determined whether or not the depression L of the accelerator pedal 25 is smaller than $L_2$, i.e., the engine is operating under a middle load. When the engine is operating under a middle load, the procedure goes to step 45, and the amount of intake stroke injection $Q_1$ and the amount of compression stroke injection $Q_2$ are calculated. Then, in step 46, the injection start time $\theta S1$ of the intake stroke injection is calculated. Then, in step 47, the injection completion time $\theta E1$ is calculated from the injection start time $\theta S1$, the amount of intake stroke injection $Q_1$ and the engine speed N. Then, in step 48, the injection start time $\theta S2$ of the compression stroke injection is calculated. Then, in step 49, the injection completion time $\theta E2$ is calculated from the injection start time $\theta S2$, the amount of compression stroke injection $Q_2$ and the engine speed N.

When it is determined in step 44 that $L \geq L_2$, i.e., when the engine is operating under a heavy load, the procedure goes to step 50, and the injection start time $\theta S1$ of the intake stroke injection is calculated. Then, in step 51, the injection completion time $\theta E1$ is calculated from the injection start time $\theta S1$, the amount of intake stroke injection $Q_1$ and the engine speed N. Then, in step 53, the injection start time $\theta 3$ of the injection by the second fuel injector 11b is calculated. Then, in step 54, the injection completion time $\theta E3$ is calculated from the injection start time $\theta S3$, the amount of injection $Q_3$ and the engine speed N. The injection of fuel by the fuel injector 11 is carried out on the basis of the injection start times $\theta S1$, $\theta S2$ and the injection completion times $\theta E1$, $\theta E2$ thus calculated.

Accordingly to the present invention, by forcing the injected fuel to impinge upon the rear face of the valve of the intake valve and then forcing the injected fuel, which is reflected on the rear face of the valve head of the intake valve, to flow into the intake port, uniform distribution of a sufficiently vaporized fuel in the combustion chamber is possible thereby ensuring adequate combustion.

While the invention has been described by reference to a specific embodiment chosen for the purpose of illustration, it should be apparent that numerous modifications could be made thereto by those skilled in the art without departing from the basic concept and scope of the invention.

I claim:

1. An engine having a cylinder head, comprising:
at least one intake valve arranged on an inner wall of the cylinder head:
a fuel injector arranged on the inner wall of the cylinder head and injecting fuel directly into the combustion chamber, the injection direction of said fuel injector being determined so that the fuel injected by said fuel injector impinges upon a rear face of a valve head of said intake valve when the amount of valve lift of said intake valve exceeds a predetermined amount, and that the fuel injected by said fuel injector moves forward toward a combustion chamber beneath said intake valve when the amount of valve lift of said intake valve is smaller than said predetermined amount, the injection pressure of said fuel injector being determined so that, when the fuel injected by said fuel injector impinges upon the rear face of the valve head of said intake valve, substantially all of the fuel is reflected on the rear face of the valve head of said intake valve and flows into an intake port of said intake valve; and injection control means for controlling the injection time and the amount of fuel injected by said fuel injector so as to inject fuel during at least one of the intake strokes and compression strokes, with at least part of the fuel injected by said fuel injector impinging upon the rear face of the valve head of said intake valve whenever the fuel injecting operation is carried out during the intake stroke, and the fuel injected by said fuel injector moving forward toward the combustion chamber beneath said intake valve when the fuel injecting operation is carried out during the compression stroke.

2. An engine according to claim 1, wherein the injection pressure of said fuel injector is higher than 70 Kg/cm$^2$.

3. An engine according to claim 1, wherein a first intake valve and a second intake valve are provided; the injection direction of said fuel injector being determined so that the fuel injected by said fuel injector impinges upon rear faces of valve heads of said first intake valve and said second intake valve when the amount of valve lift of said first intake valve and said second intake valve exceed a predetermined amount, and that the fuel injected by said fuel injector moves forward toward the combustion chamber beneath said first intake valve and said second intake valve when the amount of valve lift of said first intake valve and said second intake valve is smaller than said predetermined amount, the injection pressure of said fuel injector being determined so that, when the fuel injected by said fuel injector impinges upon the rear faces of the valve heads of said first intake valve and said second intake valve, the fuel is reflected on the rear faces of the valve heads of said first intake valve and said second intake valve and flow into an intake port of said first intake valve and an intake port of said second intake valve, respectively, with at least part of the fuel injected by said fuel injector impinging upon the rear faces of the valve heads of said first intake valve and said second intake valve whenever the fuel injecting operation is carried out during the intake stroke, and the fuel injected by said fuel injector moving toward the combustion chamber beneath said first intake valve and said second intake valve when the fuel injecting operation is carried out during the compression stroke.

4. An engine according to claim 1, wherein said injection control means injects fuel by said fuel injector in the middle of the intake stroke wherein the amount of valve lift of said intake valve is larger than said predetermined amount when an engine load is higher than a predetermined higher load and injects fuel by said fuel injector in a state wherein the amount of valve lift of said intake valve is smaller than said predetermined amount when the engine load is lower than said predetermined higher load.

5. An engine according to claim 4, wherein said injection control means injects fuel by said fuel injector at the end of the compression stroke when the engine load is lower than a predetermined lower load that is lower than said predetermined higher load, and said injection control means injects fuel by said fuel injector at the end of the compression stroke and in the middle of the intake stroke wherein the amount of valve lift of said intake valve is larger than said predetermined amount when the engine load is higher than said predetermined lower load, but is lower than said predetermined higher load.

6. An engine according to claim 5, wherein a cavity is formed on a top face of a piston of the engine, and fuel is injected by said fuel injector toward said cavity when the injecting operation is carried out at the end of the compression stroke.

7. An engine according to claim 6, wherein said cavity comprises a shallow dish portion and a deep dish portion formed on a central portion of said shallow dish portion.

8. An engine according to claim 7, wherein said fuel injector is arranged on a periphery of the inner wall of the cylinder head, and a spark plug is arranged at a central portion of the inner wall of the cylinder head; said cavity extending from a point beneath said fuel injector to a point beneath said spark plug; a recessed portion being formed on a connecting portion of said shallow dish portion and said deep dish portion at a position beneath said spark plug.

9. An engine according to claim 7, wherein fuel is injected by said fuel injector toward said deep dish portion at the end of the compression stroke when the engine load is lower than said predetermined lower load.

10. An engine according to claim 7, wherein fuel is injected by said fuel injector toward both said deep dish portion and said shallow dish portion at the end of the compression stroke when the engine load is higher than said predetermined lower load, but is lower than said predetermined higher load.

11. An engine according to claim 1, wherein a first intake valve, a second intake valve, a first intake passage connected to the combustion chamber via the first intake valve and a second intake passage connected to the combustion chamber via said second intake valve are provided, and said first intake passage comprises a helical intake port formed in the cylinder head, said second intake passage comprising a substantially straight intake port formed in the cylinder head.

12. An engine according to claim 11, wherein an intake control valve is arrange in said second intake passage and is closed when an engine load is lower than a predetermined load; said intake control valve being open when the engine load is higher than said predetermined load.

13. An engine according to claim 11, wherein said fuel injector is arranged on the peripheral portion of the inner wall of the cylinder head at a position between said first intake valve and said second intake valve.

* * * * *

UNITED STATES PATENT AND TRADEMARK OFFICE
CERTIFICATE OF CORRECTION

PATENT NO. : 5,233,956
DATED : August 10, 1993
INVENTOR(S) : Takanori UEDA, et al.

It is certified that error appears in the above-identified patent and that said Letters Patent is hereby corrected as shown below:

Column 4, line 14, change "$6_a$" to --6a--.

Column 4, line 18, change "$6_a$" to --6a--.

Column 7, line 62, change "in" (2nd occurrence) to --an--.

Column 8, line 31, change "Accordingly" to --According--.

Column 6, line 64, change "value 6b" to --valve 6b--.

Column 8, line 32, after "valve" insert --head--.

Column 9, line 35, change "flow" to --flows--.

Column 10, line 49, change "arrange" to --arranged--.

Signed and Sealed this

Nineteenth Day of April, 1994

*Attest:*

BRUCE LEHMAN

*Attesting Officer*  *Commissioner of Patents and Trademarks*